(12) United States Patent
Chen et al.

(10) Patent No.: US 8,165,277 B2
(45) Date of Patent: Apr. 24, 2012

(54) DISTRIBUTED SERVICE CREATION ENVIRONMENT FOR INTELLIGENT ENDPOINTS

(75) Inventors: Henry Chen, Plano, TX (US); Michael H. McClung, Earlysville, VA (US); Jeffery A. Sanders, Cocoa, FL (US)

(73) Assignee: Cisco Technology, Inc., San Jose, CA (US)

( * ) Notice: Subject to any disclaimer, the term of this patent is extended or adjusted under 35 U.S.C. 154(b) by 1315 days.

(21) Appl. No.: 10/984,298

(22) Filed: Nov. 8, 2004

(65) Prior Publication Data

US 2006/0101345 A1    May 11, 2006

(51) Int. Cl.
*H04M 3/42* (2006.01)
(52) U.S. Cl. .............................. 379/201.12; 379/201.02
(58) Field of Classification Search .................. 379/201, 379/88.17, 93.01, 93.17, 201.02, 201.12; 715/763, 967, 969, 734–738
See application file for complete search history.

(56) References Cited

U.S. PATENT DOCUMENTS

| | | | |
|---|---|---|---|
| 6,519,617 B1 | 2/2003 | Wanderski et al. | 707/513 |
| 6,614,899 B1 | 9/2003 | Sollee et al. | 379/218.01 |
| 6,622,015 B1 | 9/2003 | Himmel et al. | 455/414 |
| 6,674,725 B2 | 1/2004 | Nabkel et al. | 370/252 |
| 6,714,219 B2 | 3/2004 | Lindhorst et al. | 345/769 |
| 7,213,073 B1 * | 5/2007 | Slavin | 709/230 |
| 2001/0024211 A1 * | 9/2001 | Kudukoli et al. | 345/763 |
| 2005/0047573 A1 * | 3/2005 | Cameron et al. | 379/201.12 |

OTHER PUBLICATIONS

No Magic, Inc. "Magicdraw UML Made Simple," www.magicdraw.com, 5 pages.
International Telecommunication Union, "Series Q: Switching and Signalling, Intelligent Network, Distributed functional plane for intelligent network Capability Set 2: Part 1" ITU-T Telecommunication Standardization Sector of ITU, 28 pages, Sep. 1997.

* cited by examiner

*Primary Examiner* — Curtis Kuntz
*Assistant Examiner* — Amal Zenati
(74) *Attorney, Agent, or Firm* — Baker Botts L.L.P.

(57) ABSTRACT

According to one embodiment, a method for creating telephony features for an endpoint includes receiving a plurality of instructions defining a graphical representation of an implementation of one or more telephony features for an endpoint. The graphical representation includes a plurality of graphical elements representing a state process of the one or more telephony features. The graphical representation is generated in accordance with the plurality of instructions. A plurality of text commands corresponding to the graphical elements are determined. The text commands specify a plurality of actions of the state process. The graphical representation is converted into customized feature logic that includes the plurality of text commands. The text commands provide the one or more telephony features for the endpoint.

33 Claims, 4 Drawing Sheets

DISTRIBUTED SERVICE CREATION ENVIRONMENT FOR INTELLIGENT ENDPOINTS

TECHNICAL FIELD

This invention relates generally to the field of communications and more specifically to providing a distributed service creation environment for intelligent endpoints.

BACKGROUND

As communications technologies develop, voice services and data services have increasingly converged. One such example is the use of Internet protocol (IP) technology to transport voice data. The use of IP technology enables voice traffic to gain the benefits of packet communication protocols. Similarly, other technologies may provide benefits when applied to telephony systems. Discovering appropriate technologies and uses for these technologies, however, remains a daunting challenge.

SUMMARY OF THE DISCLOSURE

In accordance with the present invention, disadvantages and problems associated with previous techniques for creating telephony features for an intelligent endpoint may be reduced or eliminated.

According to one embodiment, a method for creating telephony features for an endpoint includes receiving a plurality of instructions defining a graphical representation of an implementation of one or more telephony features for an endpoint. The graphical representation includes a plurality of graphical elements representing a state process of the one or more telephony features. The graphical representation is generated in accordance with the plurality of instructions. A plurality of text commands corresponding to the graphical elements are determined. The text commands specify a plurality of actions of the state process. The graphical representation is converted into customized feature logic that includes the plurality of text commands. The text commands provide the one or more telephony features for the endpoint.

Certain embodiments of the invention may provide one or more technical advantages. A technical advantage of one embodiment may be that integrated services features may be created for an endpoint. In particular embodiments, a service creation environment may be accessed by a user. The service creation environment may include a user interface that allows the user to create a graphical representation of an implementation of one or more telephony features. Another technical advantage may be that users may use the service creation environment to enhance or modify default platform behavior of an endpoint to create call and key features. Another technical advantage may be that telephony features are created by way of a graphical representation that can be converted into feature logic. The conversion of the graphical representation to feature logic enables the creation of telephony features at the user's request without user knowledge of the computerized language employed by the feature logic. A further technical advantage may be that the feature logic may provide services such as hold requests, transfer requests, multiple calls per line, shared lines, video, instant messaging, or other telephony services.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
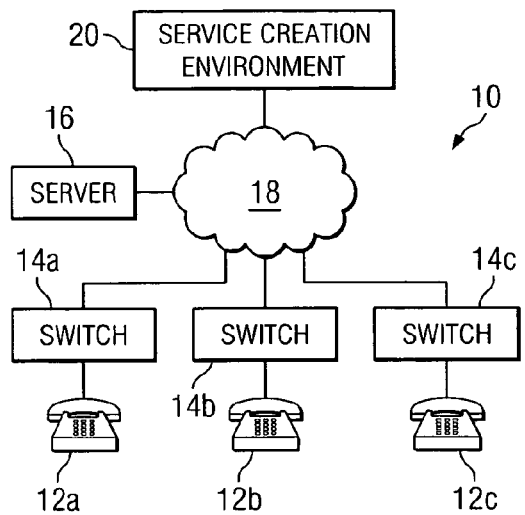
FIG. 1 is a block diagram of one embodiment of a system that includes endpoints and a service creation environment.

FIG. 1 is a block diagram of one embodiment of a system 10 that includes endpoints 12. According to the embodiment, a service creation environment may be provided for creating telephony features for an endpoint 12. In particular, the service creation environment may enable the generation of a graphical representation of a state process for a customized telephony feature. The graphical representation may then be converted into feature logic, which can be executed by endpoint 12. The feature logic generated from the graphical representation may allow the default behavior of endpoint 12 to be modified for basic call and key features. For example, the features may include customized services for handling hold requests, transfer requests, multiple calls per line, shared lines, or other telephony features. Because the feature logic is generated from the graphical representation created through the service creation environment, however, a knowledge of the computerized language employed by the feature logic is not necessary for creation of the telephony feature.

According to the illustrated embodiment, system 10 includes one or more endpoints 12, one or more switches 14, a server 16, a communications network 18, and a service creation environment 20 coupled as shown. An endpoint 12 represents any suitable combination or arrangement of logic for providing communication services such as telephony services. Logic may refer to hardware, software, or any combination of hardware and software. Examples of an endpoint 12 include a communication device such as a telephone, a cell phone, a personal digital assistant, a voice appliance, an answering machine, a facsimile machine, a computer, or other device. An embodiment of an endpoint 12 is described in greater detail with reference to FIG. 2.

Referring to FIG. 1, an endpoint 12 may provide certain telephony features. Specifically, users of the endpoint 12 may use the service framework interface to enhance or modify default platform behavior in a way that creates call and key features. Accordingly, feature logic, such as logic instructions, may operate to provide customized features with respect to hold requests, transfer requests, multiple calls per line, shared lines, video, instant messaging, and other telephony services. The feature logic manipulates lower-level functions of endpoint 12 to implement a particular state to provide the telephony features. The feature logic may be written in any suitable language such as JAVA or a text-based language such as extensible markup language (XML). The feature logic may be included in text files stored at an endpoint 12 or in web pages loaded and executed by a service framework of endpoint 12.

Feature logic may include instructions for endpoint outputs, endpoint operations, or both. In particular embodiments, feature logic may invoke the endpoint output and operations modules using one or more web services interfaces. Other services in the network may also be invoked by feature logic. The services being invoked do not need to reside on the underlying endpoint 12, but endpoint 12 may provide the service or may support relaying the request to another node in the network that does support the service invocation. An endpoint output refers to information presented through an endpoint interface, such as a sound, light, or display. Feature logic may instruct an output processing module to handle commands that interact with the endpoint interface. For example, a script or other feature logic may instruct an output processing module to turn on a flashing light emitting diode (LED) to indicate a waiting voicemail message.

In particular embodiments, the feature logic supporting the telephony features offered by an endpoint 12 may be generated using service creation environment 20. Service creation environment 20 may include a computing device, the appropriate software, or both, for generating scripts and other feature logic from a modeling application. In particular embodiments, the modeling application may include Unified Modeling Language (UML), Freeform, a general flowchart generator, or other software development tool suitable for generating models. The modeling application allows users to generate feature logic for telephony features. The modeling application can be used to create a flowchart, state diagram, activity diagram, message sequence diagram, interaction diagram, or other modeling diagram that graphically illustrates the actions to be taken by an endpoint 12 upon the occurrence of an event. The feature logic may be generated by a user who is familiar with the modeling application, but not with writing feature logic in XML or other computing languages. The generation of feature logic from a modeling tool is described in more detail below with regard to FIGS. 4-5.

An endpoint operation refers to an operation of endpoint 12. As an example, an endpoint operation may generate messages to an external element such as server 14 or other endpoints 12. As another example, an endpoint operation may command internal operations, such as linking multiple call legs within a conference bridge, routing a call leg to a speaker, or initiating a timer. Feature logic may instruct an operations processing module to handle commands that control the components of endpoint 12. State machines such as an output processing module and operations processing module may work in tandem to effect a procedure controlled by a command.

According to one embodiment, feature logic may include an event handler that specifies a response of endpoint 12 to an event. Events include internal events and external events, for example, input from users, other endpoints 12, or external devices. Upon detecting an event, a state machine may access a web page to determine whether the page includes an event handler for the detected event. If so, the state machine responds to the event according to the instructions within the event handler. An event handler can link to another location within the feature logic, link to another web page, or process the event.

As a specific example, an event might include a telephone being taken off-hook. The service framework may allow a user of endpoint 12 to create a feature that responds when the telephone is taken off-hook. The event may trigger a customized feature such as a customized dial tone, a displayed icon, or both. The service framework may also provide other features, such as call hold, call transfer, call pick-up, call distribution, call conferencing, video transmission, voice messaging, and instant messaging, other feature, or any combination of the preceding. In particular embodiments, the service framework may operate as an arbitrator where two or more features are triggered by an event. Thus, the service framework of endpoint 12 may arbitrate between the two state machines providing the instructions to determine which feature should intervene. One embodiment of a service framework is described in greater detail with reference to FIG. 3.

Referring to FIG. 1, switches 14 represent network equipment operable to route, translate, or both route and translate communications. Server 16 comprises any suitable combination or arrangement of logic operating to support telephony services provided by endpoints 12. Server 16 may provide a centralized repository of web pages for use by endpoints 12 to provide telephony features. Server 16 may communicate the web pages from memory 20 to endpoints 12 in response to web page requests. Server 16 may reside within endpoints 12 or in system 10.

Network 18 represents any suitable combination or arrangement of components supporting communications between endpoints 12 and server 14. For example, network 18 may include one or more local area networks (LANs), one or more wide area network (WANs), elements of a public switched telephone networks (PSTN), portions of the Internet, components of other suitable communications networks, or any combination of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of switch 14 and server 16 may be performed by one module, or the operations of server 16 may be performed by more than one module, so long as certain endpoints 12 provide proxy server features. Additionally, operations of system 10 may be performed using any suitable logic comprising software, hardware, other logic, or any suitable combination of the preceding. As used in this document, "each" refers to each member of a set or each member of a subset of a set.

Figure 2:
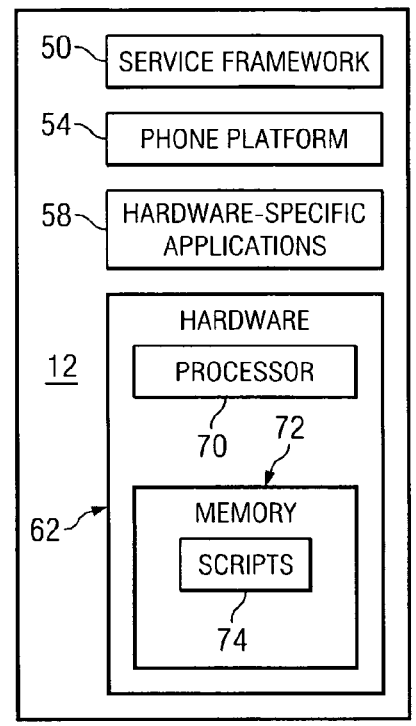
FIG. 2 is a block diagram of one embodiment of an endpoint that includes a service framework.

FIG. 2 is a block diagram of one embodiment of an endpoint 12 that includes a service framework 50. According to the illustrated embodiment, endpoint 12 includes service framework 50, a phone platform 54, hardware-specific applications 58, and hardware 62. Service framework 50 provides customizable telephony features by executing feature logic. The feature logic may be included in web pages loaded and executed by service framework 50. One embodiment of service framework 50 is described in greater detail with reference to FIG. 3.

Referring again to FIG. 2, phone platform 54 includes software that allows endpoint 12 to communicate. Phone platform 54 may include code, configuration data, applications, media, other information, or any combination of the preceding. Code represents logic executed by the elements of endpoint 12 to implement functionality. According to one embodiment, code may include logic used by a state engine to interpret and execute feature logic, such as a real-time interpreter operable to run downloaded feature logic. Phone platform 54 may include a JAVA native interface (JNI) and a JAVA virtual machine that interprets executable byte code as a JAVA application is running.

Configuration data represents settings used by endpoint 12 during initialization and operation. For example, configuration data may identify a particular server 14 from which endpoint 12 should request web pages. Applications include programs that provide underlying management and control of the operation of endpoint 12. For example, applications may include a media manager, an application manager, a property manager, a call agent, other program, or any combination of the preceding. One or more applications may be managed by an application manager. Media maintained within applications can include data such as user recorded prompts for voicemail applications, messages from other users, or other appropriate information.

Hardware-specific applications 58 include programs for controlling hardware 62. Examples of hardware-specific applications 58 include native services or native operating systems. Hardware 50 may refer to electronic, mechanical, or electromechanical components of endpoint 12. According to the illustrated embodiment, hardware 50 includes a processor 70 and a memory 72. Processor 50 manipulates data to control the operation of endpoint 12. Memory 72 stores and facilitates retrieval of information used by the processor, and may include random access memory (RAM), read only memory (ROM), magnetic drives, disk drives, compact disk (CD) drives, digital video disk (DVD) drives, removable media storage, any other suitable data storage device, or a combination of any of the preceding.

According to the illustrated embodiment, memory 72 stores feature logic. In particular embodiments, memory 72 may store all of the feature logic required for endpoint 12 to provide telephony features. Accordingly, when an event is detected, a state machine within service framework 50 may access memory 72 to obtain a webpage with the instructions for responding to the event. In other embodiments, endpoint 12 may maintain a limited set of commonly used web pages within memory 72 and request other web pages from server 16. As such, when an event is detected, the state machine may determine whether the event is a commonly occurring event for which a webpage is maintained in memory 72. If the web page is not maintained in memory 72, the state machine may then access server 16 for the web page containing the appropriate event handler.

Hardware 50 may include other suitable components, for example, interface modules and signal processing modules. Interface modules may include user interface modules and network interface modules. User interface modules provide for the exchange of information with users of endpoint 12, and may include a speaker, a microphone, a display, an input interface, other module, or any combination of the preceding. A speaker generates audio signals, and a microphone receives and processes audio signals from a user. A display presents information to a user, and may include an LED, a graphical display, or other device for visually displaying or otherwise presenting information. An input interface represents any suitable element for receiving input from a user. For example, a user input interface may include a number keypad, one or more buttons referencing portions of display, a pointing device, other appropriate input interface, or any combination of the preceding.

Network interface modules provide for communication between endpoint 12 and other equipment. For example, a network interface may link to switch 32 and provide for packet-based voice communications. A network interface may provide for coupling to any suitable communications equipment using any appropriate techniques and protocols. A network interface may support any appropriate wireless, wireline, or both wireless and wireline communications protocol.

Signal processing modules provide for the manipulation and enhancement of signals. According to particular embodiments, signal processing modules may include digital signal processing capabilities for compression, echo cancellation, silence detection, or other appropriate signal processing.

Modifications, additions, or omissions may be made to endpoint 12 without departing from the scope of the invention. The components of endpoint 12 may be integrated or separated according to particular needs. Moreover, the operations of endpoint 12 may be performed by more, fewer, or other modules. Additionally, operations of endpoint 12 may be performed using any suitable logic comprising software, hardware, other logic, or any suitable combination of the preceding.

Figure 3:
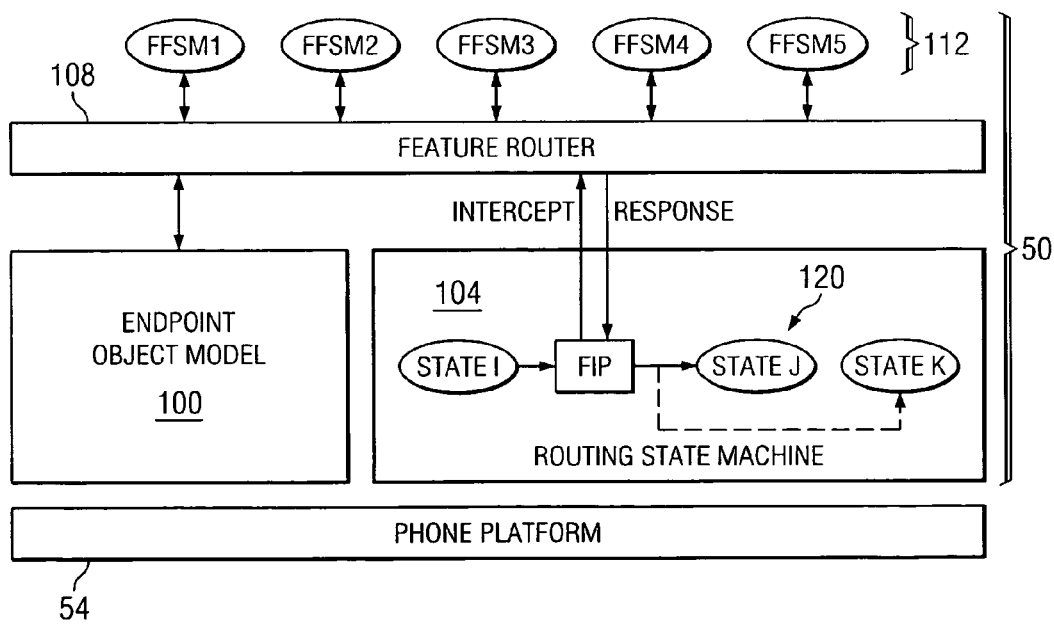
FIG. 3 is a block diagram of one embodiment of a service framework of an endpoint.

FIG. 3 is a block diagram of one embodiment of service framework 50 of endpoint 12. Service framework 50 may allow endpoint 12 to provide telephony features using any suitable method. An example method is described in more detail with reference to FIG. 5. In operation, service framework 50 exposes SIP-like primitives to direct an underlying SIP User Agent. Service framework 50 incorporates intelligent event routing in a way that helps manage feature interaction within the SIP framework.

According to the illustrated embodiment, service framework 50 includes an endpoint object model 100, one or more state machines 104, a feature router 108, and feature finite state machines (FFSMs) 112 coupled as shown. Endpoint object model 100 includes objects that have platform logic that exposes interaction points or provides a supporting function. An object represents an aspect of endpoint 12, such as a component of endpoint 12. For example, an object may represent a ringer, device, line, call, or dialog. An event occurring at an object may initiate one or more states of endpoint 12.

In general, a state machine tracks a current state and defines a next state according to a state process. A state process may refer to a process that defines the next state given a previous state and other conditions, and may be described using a state diagram. A state machine loads and executes instructions of a state process to implement the state process.

A state machine 104 is associated with an endpoint object defined by endpoint object model 100. In the illustrated embodiment, routing state machine 104 tracks the current state of phone platform 54 and defines the next state according to an endpoint state process. An endpoint state process refers to a state process that controls the operation of endpoint 12. An endpoint state process may include a feature interaction point (FIP), which refers to a point of a state process at which feature router 108 may intercept the state process and provide a response.

According to the illustrated embodiment, a state diagram 120 indicates that state i is followed by a feature interaction point. Feature router 108 intercepts the process at the feature interaction point, routes the intercept to one or more feature finite state machines that have subscribed for that intercept, determines a response from the feature finite state machines, and provides the collaborative response. Depending upon the response, the next state may be state j or state k. Example routing state machines 104 include device, line, call, and dialog state machines.

Feature router 108 coordinates feature finite state machines 100 and routing state machines 112 to provide features. Feature router 108 intercepts a state process and provides a response. Feature router 108 may determine the response according to instructions provided by feature finite state machines 112, and resolve conflicts between contradictory instructions. Generally, feature router 108 may intercept an event posted by a routing state machine 112 on some state, re-route the event to feature finite state machines 112, and send intercept responses back to the routing state machine 112.

In particular embodiments, feature router 108 may act as an arbitrator for resolving conflicts between event handlers. A conflict may occur if a single event triggers service framework 50 to access two or more web pages and obtain two or more sets of instructions for responding to the event. Feature router 108 allows collaboration between the multiple features that may be implicated by an event. For example, the event may include an off-hook signal. Where two features have registered for an intercept for the off-hook signal, multiple state machines may be interested in the collaboration. Thus, multiple state machines may be involved in the transition such that the transition from a first state to a second is not automatic. Rather, the features implicated may participate in the decision of which set of instructions should be implemented in response to the event.

Feature finite state machines 112 are state machines that provide instructions to implement features. A feature finite state machine 112 is notified of the current state of an endpoint state process occurring at routing state machine 104, and defines the next state according a feature state process. A feature state process may refer to a process that provides a telephony feature such as hold requests, transfer requests, multiple calls per line, shared lines, video, instant messaging, and other telephony services.

According to one embodiment of operation, feature finite state machines 112 register with feature router 108 to obtain an intercept at a specific point of a state process managed by routing state machines 104. Feature finite state machines 112 may be allowed to register for notification at specific feature interaction points. When the specific point occurs, state machine 104 provides an intercept to feature router 108, which in turn notifies feature finite state machines 112. In response, feature finite state machines 112 provide instructions to feature router 108. Feature router 108 determines a response for the event.

As described above, in certain situations, feature router 108 may receive conflicting instructions from feature finite state machines 112. Feature router 108 may resolve the conflict to determine the response according to the priority of the features. Feature router 108 then sends the response to state machine 104.

Modifications, additions, or omissions may be made to service framework 50 without departing from the scope of the invention. The components of service framework 50 may be integrated or separated according to particular needs. Moreover, the operations of service framework 50 may be performed by more, fewer, or other modules. For example, the operations of feature router 108 may be performed by more than one module, and operations of service framework 50 may be performed using any suitable logic comprising software, hardware, other logic, or any suitable combination of the preceding. Additionally, although service framework 50 is described as being a component of endpoint 12, it is recognized that, in some embodiments, service framework 50 may be incorporated into a remote node that is external to and independent from endpoint 12.

Figure 4:
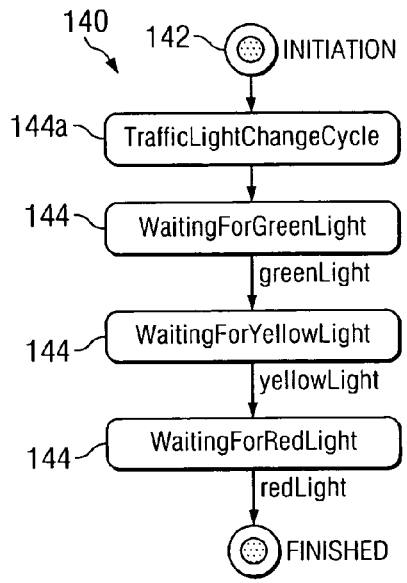
FIG. 4 is a block diagram of one exemplary embodiment of a graphical representation that may be transposed into feature logic for providing telephony features.

FIG. 4 illustrates a simple example embodiment of a graphical representation that may be converted into feature logic. Specifically, FIG. 4 is a block diagram of one exemplary embodiment of a graphical representation 140 that defines a state diagram for implementing a state process for monitoring changes in a traffic light. A modeling application offered by service creation environment 20 may be used to create graphical elements in order to generate graphical representation 140. For example, a user of service creation environment 20 may use a UML modeling application to generate graphical representation 140. As will be described below, graphical representation 140 may be converted to feature logic for execution on intelligent endpoints 12.

Graphical representation 140 includes a variety of states. Each state may execute one or more actions upon entry of the state and a list of actions upon exit from that state. An action may be as simple as "ChangeState". In particular embodiments, the action may include a Web Service Invocation, which may be local or remote and simple or complex. In particular embodiments, each time an event is received for which the feature is registered to receive an intercept, the state may execute one or more actions corresponding to a transition. Accordingly, during the creation of graphical representation 140, each action may be described within service creation environment 20. For example, an action may be described by setting up one or more parameters that are required by the action. Some of the information required by these parameters may only be available at run time from either parameters of the event message that caused the transition or from platform objects. The modeling application offered by service creation environment 20 would help the developer to construct these actions.

In the illustrated embodiment, graphical representation 140 includes an initiation point 142 from where the state process begins. Graphical representation 140 indicates that, as events are detected, the state process transitions between states 144. For example and in particular embodiments, an initial state 144a may subscribe for a changeNotification message from a Traffic Light Web Service. When initial state 144a gets a change Notification message the state process may transition from one state 144 to another state 144. For the illustrated example, a specific sequence of states 144 is assumed to be green, yellow, and red, as that is customary for traffic lights.

After the generation of graphical representation 140 on service creation environment 20, graphical representation 140 may be converted into feature logic. As described above, in particular embodiments, the feature logic may comprise script that includes text commands specifying the actions to be taken upon the occurrence of an event. The conversion of graphical representation 140 may be made using a conventional modeling tool that outputs XML or other script or feature logic. Alternatively, the conversion may be made using a unique program implemented by service creation environment 20 or another node in system 10. The following is an example script that may be generated from graphical representation 140:

```
<page name="trackLightChangeCycle"
    xmlns= 'http://www.cisco.com/xsis"
    xmlns:tl="http://www.traffic.com/traffic">
    <head>
```

-continued

```
<service name="wsTrafficLight"
type="urn:traffic.com/trafficService" >
    <client
url="http://www.traffic.com/trafficService"/>
    </service>
    <body >
        <message service="wsTrafficLight">
            <tl:subscribeChangeNotification/>
        </message >
        <next name="waitForGreenLight">
            <parm name="ws"> ws </parm>
        </next>
    </body>

<parm name="ws" />
    <head>
        <handler service="ws">
            <on-message tag=" 'greenLight' ">
                <next name="waitForYellowLight">
                    <parm name="ws"> ws </parm>
                </next>
            </on-message>
        </handler>
    </head>

<parm name="ws" />
    <head>
        <handler service="ws">
            <on-message tag=" 'yellowLight' ">
                <next name="waitForRedLight">
                    <parm name="ws"> ws </parm>
                </next>
            </on-message>
        </handler>
    </head>

<parm name="ws" />
    <head>
        <handler service="ws">
            <on-message tag="' 'redLight' ">
                <next name="finished"/>
            </on-message>
        </handler>
    </head>

```

The script includes features particular to each state 144. For example, each state 144 in graphical representation 140 is represented in the script by a named  section. Additionally, where an action includes a Web Service Invocation, a message is set up in a <head> section. For example, the script indicates that at initial state 144a, a Web Service Invocation is specified as "wsTrafficLight" at the url "http://www.traffic.com/traffic-Service". Additional features of the script include that the EnterState logic for initiation state 144a is invoked in a <body> section and that each transition between states 144 is described in a <handler> section.

The illustrated graphical representation 140 and the corresponding script are provide as a simple example to illustrate the conversion of a graphical representation 140 into script or other feature logic. Furthermore, it is recognized that modifications, additions, or omissions may be made to graphical representation 140 without departing from the scope of the invention. For example, although only one action included a Web Service Invocation in the described example, the state process may include many actions including a Web Service Invocation or none. As another example, although a state diagram is illustrated and described, it is generally recognized that the state diagram is merely one example of a graphical representation that may be used to create telephony features by service creation environment 20. Additional examples of graphical representations that relate to telephony features specifically are described below. Furthermore, the script that is generated from graphical representation 140 need not be text-based. The script may include any suitable feature logic for implementing a state process and may vary in complexity as is required by the state process.

Figure 5A:
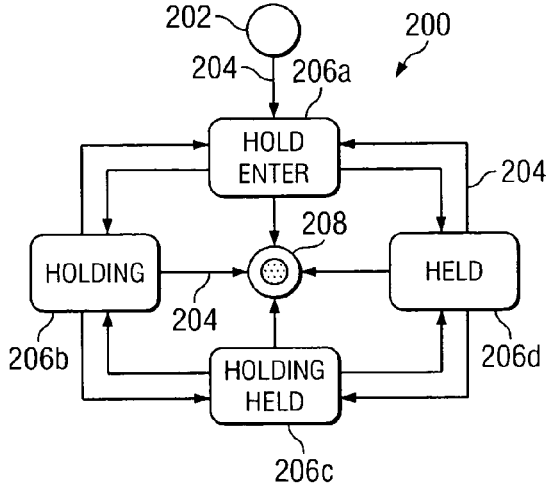
FIGS. 5A-5D are block diagrams of other exemplary embodiments of graphical representations that may be transposed into feature logic for providing telephony features.

FIGS. 5A-5D illustrate additional exemplary embodiments of a graphical representations that may be transposed into feature logic for providing telephony features to an endpoint 12. Specifically, FIG. 5A is a block diagram of one exemplary embodiment of a graphical representation 200 that defines a state diagram for implementing a telephony feature. In the particular example embodiment illustrated, the graphic representation 200 includes a UML state diagram for generating a telephony feature for holding a call. A modeling application offered by a service creation environment 20 may be used to create graphical elements in order to generate graphical representation 200. For example, a user of service creation environment 20 may use a UML modeling application to generate graphical representation 200.

In the illustrated example, the hold feature is implemented using graphical representation 200. Graphical representation 200 includes an initiation point 202 from where a call begins. For example, if a caller at endpoint 12a calls or otherwise begins a communication session with a caller at endpoint 12b, endpoint 12a may enter the state represented in graphical representation 200 at initiation point 202. As events occur during the call, the events may trigger the transitioning of endpoint 12a from one state to another state. Each line 204 in graphical representation 200 represents an interaction of Feature Finite State Machine 104 with phone platform 54 as endpoint 12a detects events, prioritizes between telephony features, and responds with appropriate actions.

At the hold enter state 206a, endpoint 12a continues to participate in the call in an uninterrupted manner. Integrated service framework 50 of endpoint 12a may be directed to wait for the occurrence of an event for which hold enter state 206a is registered to receive an intercept. For example, integrated service framework 50 may wait for a request generated by the pressing of a hold button to signify a change in state. If the caller at endpoint 12a desires to place the caller at endpoint 12b on hold, for example, the caller at endpoint 12a may press the hold button. When integrated service framework 50 of endpoint 12a identifies the occurrence of the event, integrated service framework 50 of endpoint 12a may be directed to send the intercept to a feature finite state machine represented by the illustration, which would in turn respond by transitioning into an idle holding state 206b. The actions taken by the Hold FFSM 50 of endpoint 12a may include the displaying of a "hold" indicator on a display associated with endpoint 12a. In hold state 206b, endpoint 12b is now "held" by endpoint 12a.

Endpoint 12a may remain in the holding state 206b until a second event is detected by integrated service framework 50. An example of a second event that may be detected may include the receipt of an incoming SIP ReInvite message indicating a hold request has occurred by the caller at endpoint 12b. When integrated service framework 50 of endpoint 12a detects the ReInvite request by the caller at endpoint 12b, integrated service framework 50 of endpoint 12a may be directed to enter the holding held state 206c. Thus, endpoint 12a has transitioned from the holding state 206b to the holding held state 206c. At the holding held state 206c, both parties to the call have independently initiated a hold. Thus, the caller at endpoint 12a is "held" by the caller at endpoint 12b, and the caller at endpoint 12b is "held" by the caller at endpoint 12a.

Integrated service framework 50 of endpoint 12a may be directed to remain in this state until a third event is detected. In one example, the third event may include a resume event such as the second pressing of the hold button or the pressing of another key operable to resume the call by the caller at endpoint 12b. For example, the caller at endpoint 12b may push the appropriate button to terminate the phone call on the second line and resume the phone call with the caller at endpoint 12a. In such an instance, integrated service framework 50 of endpoint 12a may receive an incoming SIP ReInvite message indicating the resume request causing the Hold FFSM 50 to return to holding state 206b. As described above, the caller at endpoint 12a will remain in the holding state 206b until an event is detected that indicates to integrated service framework 50 that states should again be transitioned.

In another example, the third event may include a resume event initiated by endpoint 12a while endpoint 12b is still taking another call on the different line. In particular embodiments, a resume request initiated by endpoint 12a may result in endpoint 12a sending a SIP ReInvite to endpoint 12b. Where such an event is detected, integrated service framework 50 of endpoint 12a may be directed to transition to a held state 206d. In held state 206d, endpoint 12a is now "held" by endpoint 12b. At the occurrence of such an event (and other events described above), the feature logic may result in an update of the user display and media state at each endpoint 12.

Endpoint 12a may remain in the held state 206d until a further event is detected. An example of an event that may result in the termination of held state 206d may include the pressing of the hold button, a resume button, or another appropriate button by the caller at endpoint 12b. Thus, when the caller at endpoint 12b desires to return to the call with the caller at endpoint 12b, integrated service framework 50 may detect the occurrence of an event signaling the desire of the caller at endpoint 12b to rejoin the initial communication with the caller at endpoint 12a. When such an event is detected, integrated service framework 50 may send an intercept to the Hold FFSM 50, which is thus directed to return to hold enter state 206a. By returning to hold enter state 206a, neither caller at endpoints 12a or 12b is being "held" and the call may continue until either party wishes to return to a hold state or terminate the call, at which time integrated service framework 50 may be directed to transition to a call termination state 208.

Although a UML state diagram is illustrated and described, it is generally recognized that the UML state diagram is merely one example of a graphical representation that may be used to create telephony features by service creation environment 20. In other examples, the graphical representation may include a flowchart, activity diagram, message sequence diagram, interaction diagram, or any other graphical representation that may be used to generate feature logic including actions for responding to an event.

Figure 5B:
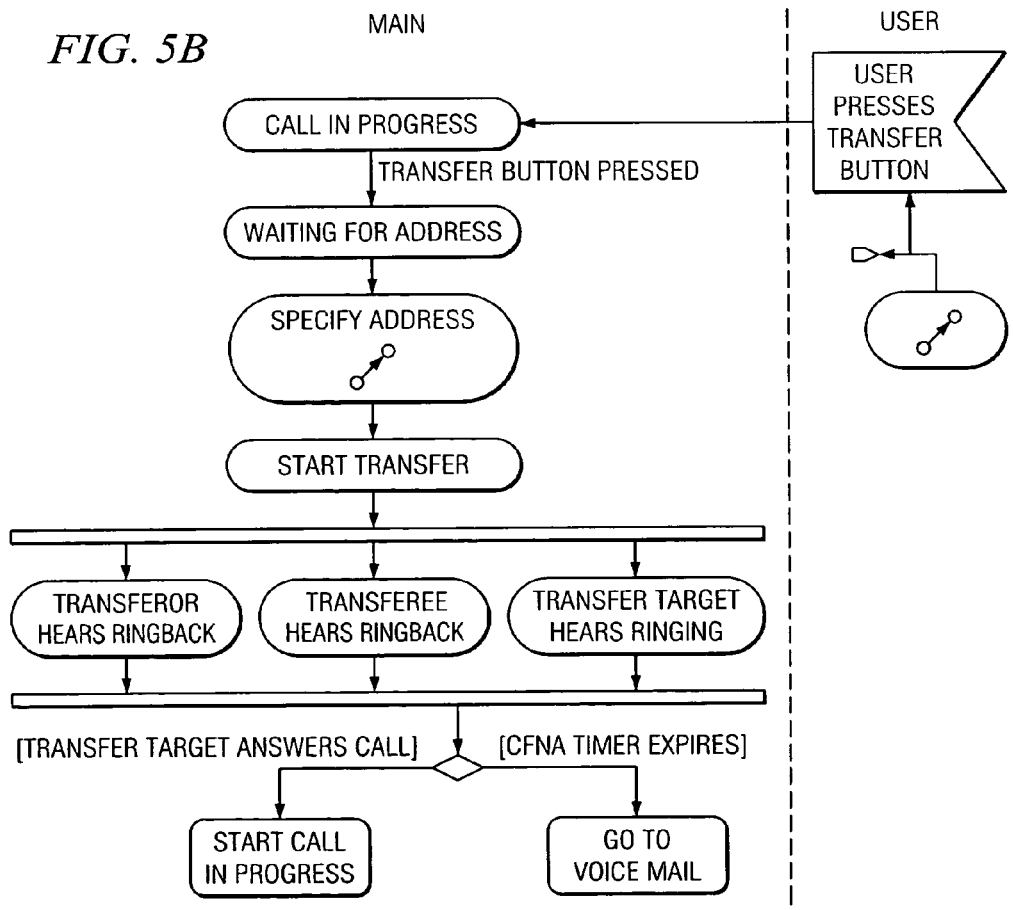
Figure 5C:
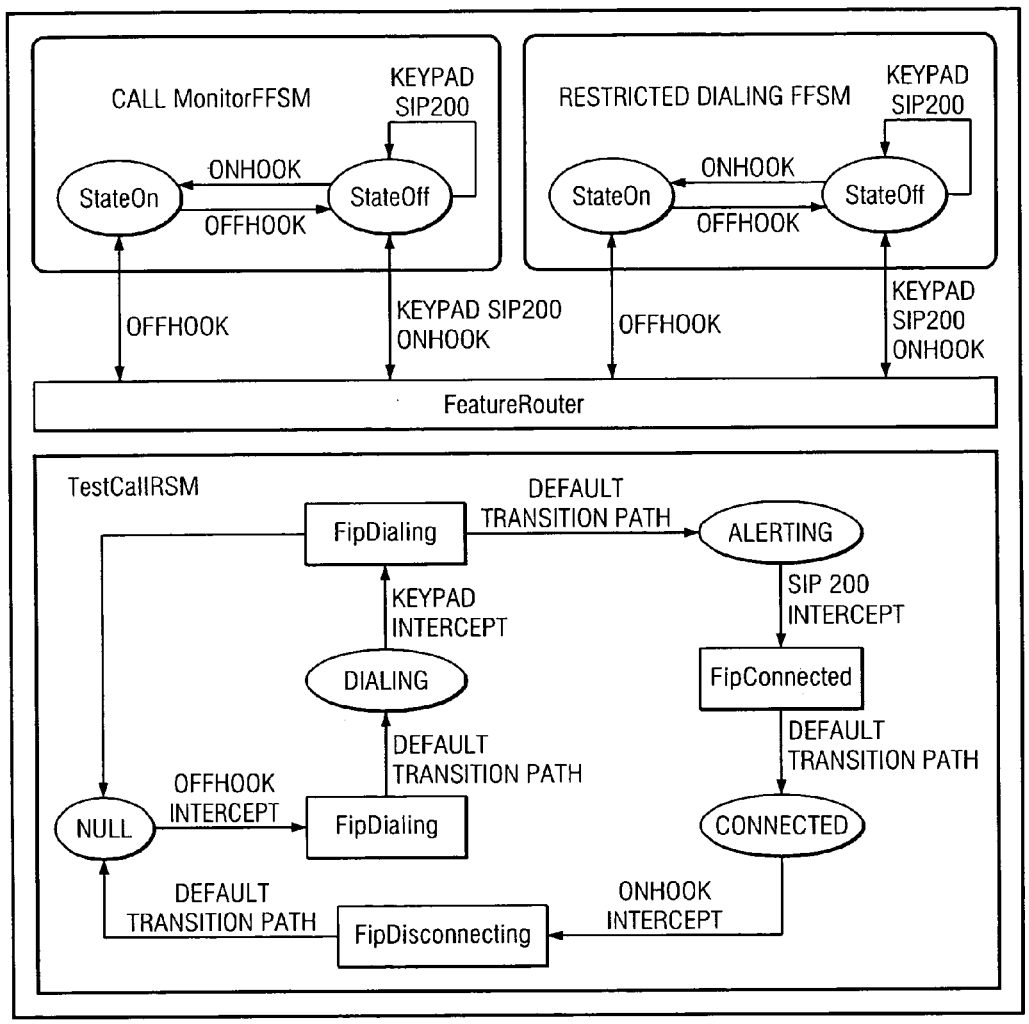
Figure 5D:
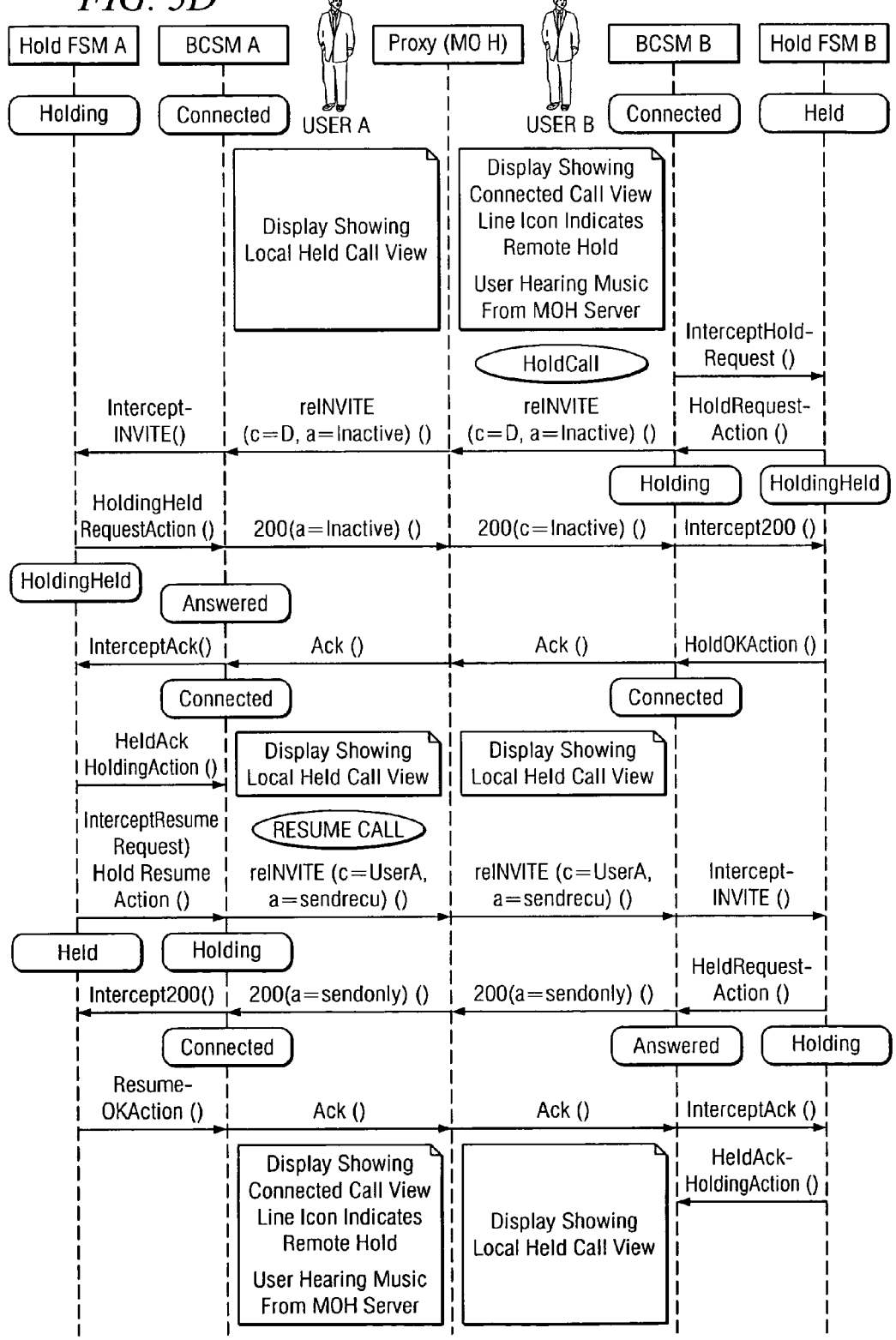

FIGS. 5B-5D illustrate other exemplary graphical representations that may be created using service creation environment 20. Specifically, FIG. 5B illustrates an exemplary activity diagram depicting the creation of a transfer telephony feature. FIG. 5C illustrates an exemplary Freeform state machine interaction diagram that depicts the interaction between two FFSMs 112 at the occurrence of a registered event. FIG. 5D illustrates an exemplary Freeform message sequence and activity diagram that depicts a hold feature. Similar to FIG. 4 described above, FIGS. 5A-5D may also be transposed into feature logic for providing the depicted telephony features to an endpoint 12.

Figure 6:
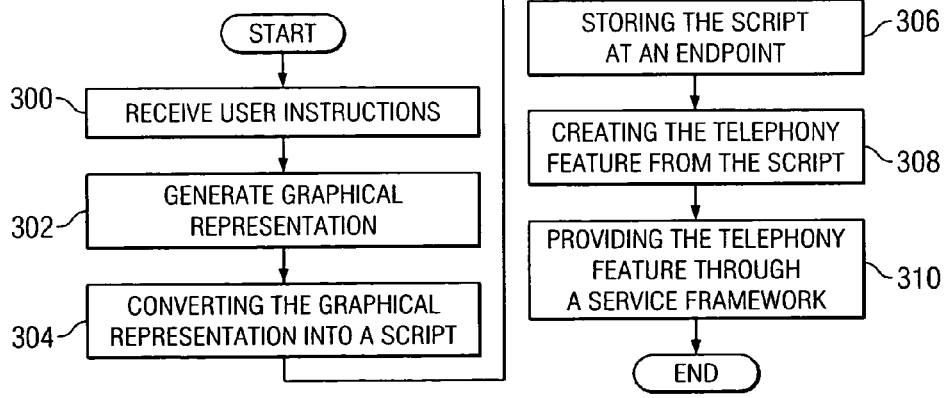
FIG. 6 is a flowchart of one embodiment of a method for creating integrated service features using a service creation environment.

FIG. 6 is a flowchart of one embodiment of a method for creating one or more telephony features using service creation environment 20 of FIG. 1. According to the embodiment, the service creation environment 20 includes an application for generating a graphical representation 200 of an implementation of one or more telephony features for an endpoint 12.

The method begins at step 300, where user instructions are received. In particular embodiments, the user instructions may be received through an interface associated with the service creation environment 20. The user instructions may include requests for telephony features, which may include customized services relating to hold requests, multiple calls per line, shared lines, or other telephony features. The user instructions may include modifications to default behavior of endpoint 12 for basic call and key features.

At step 302, a graphical representation 200 is generated. In particular embodiments, graphical representation 200 may be generated by a user of service creation environment 20. To this end, service creation environment 20 may include a modeling application operable to generate graphical representation 200 at the user's direction. For example, in particular embodiments, the application stored at service creation environment 20 may include a Unified Modeling Language application, a Freeform application, or another modeling application. The graphical representation generated may include a flowchart, a state diagram, an activity diagram, a message sequence diagram, a message sequence and activity diagram, an interaction diagram, or another modeling diagram.

Graphical representation 200 may be converted into feature logic at step 304. The feature logic may include a web page that provides actions and instructions to endpoint 12. According to one embodiment, each web page may be associated with one or more telephony features. The feature logic may include an event handler that identifies the occurrence of an event for which the actions included in the feature logic may be performed by an endpoint 12.

At step 306, the feature logic is stored at endpoint 12. In particular embodiments, the feature logic may be stored in memory 72 of endpoint 12. Upon storing the feature logic, the telephony feature may be created at step 308 and provided through a service framework 50 at step 310. The service framework 50 may be substantially similar to the service framework 50 described above with regard to FIG. 3 and provide the customized telephony feature to endpoint 12.

In particular embodiments, the telephony feature may be registered to receive an intercept at the occurrence of an event. When the event is identified, the feature logic associated with the one or more telephony features may be loaded and the actions provided in the feature logic performed. The actions may result in an override of a default action typically performed by endpoint 12 upon the occurrence of the event.

Modifications, additions, or omissions may be made to the method without departing from the scope of the invention. The method may include more, fewer, or other steps. Additionally, steps may be performed in any suitable order without departing from the scope of the invention.

A technical advantage of one embodiment may be that integrated services features may be created for an endpoint. The service creation environment may include a user interface that allows a user to create a graphical representation of an implementation of one or more telephony features. A user may use the service creation environment to enhance or modify default platform behavior of an endpoint to create call and key features. Because the telephony features are created by way of a graphical representation that can be converted into feature logic, scripted services may be created without user knowledge of the computerized language employed by the feature logic. The conversion of the graphical representation to feature logic, however, enables the creation of telephony features at the user's request. The scripted instructions may provide services such as hold requests, transfer requests, multiple calls per line, shared lines, video, instant messaging, or other telephony services.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for creating user-requested telephony features for an endpoint, comprising:
   receiving a plurality of instructions defining a graphical representation of an implementation of one or more telephony features for an endpoint, the graphical representation comprising a plurality of graphical elements, each graphical element representing at least a portion of a state process of the one or more telephony features;
   generating the graphical representation in accordance with the plurality of instructions;
   converting a first graphical element into a first text command;
   converting a second graphical element into a second text command,
   the first and second text commands specifying a plurality of actions of the state process;
   determining customized feature logic comprising the first and second text commands, the first and second text commands operable to provide the one or more telephony features for the endpoint; and
   communicating the customized feature logic to the endpoint for storage.

2. The method of claim 1, wherein the plurality of instructions direct the creation of the one or more telephony features.

3. The method of claim 1, wherein generating the graphical representation of the implementation of the one or more telephony features comprises:
   providing a modeling application operable to receive the plurality of instructions; and
   generating the graphical representation using the modeling application.

4. The method of claim 3, wherein the modeling application is operable to generate the graphical representation in Unified Modeling Language or Freeform.

5. The method of claim 1, wherein the graphical representation is selected from a group consisting of a flowchart, a state diagram, an activity diagram, a message sequence diagram, a message sequence and activity diagram, an interaction diagram, or any combination of the preceding.

6. The method of claim 1, further comprising storing the feature logic at a service framework at the endpoint, the service framework operable to provide the one or more telephony features from the feature logic.

7. The method of claim 1, wherein the one or more telephony features are operable to receive an intercept at the occurrence of an event.

8. The method of claim 1, wherein an action of the feature logic specifies an output corresponding to a particular state of the telephony feature.

9. The method of claim 1, wherein the feature logic is accessed using a web page.

10. Logic for creating user-requested telephony features, the logic embodied in a non-transitory computer-readable medium and operable to:
    receive a plurality of instructions defining a graphical representation of an implementation of one or more telephony features for an endpoint, the graphical representation comprising a plurality of graphical elements, each graphical element representing at least a portion of a state process of the one or more telephony features;
    generate the graphical representation in accordance with the plurality of instructions;
    convert a first graphical element into a first text command;
    convert a second graphical element into a second text command,
    the first and second text commands specifying a plurality of actions of the state process;
    determine customized feature logic comprising the first and second text commands, the first and second text commands operable to provide the one or more telephony features for the endpoint; and
    communicate the customized feature logic to the endpoint for storage.

11. The logic embodied in the non-transitory computer readable medium of claim 10, wherein when receiving a plurality of instructions the logic is further operable to direct the creation of the one or more telephony features.

12. The logic embodied in the non-transitory computer readable medium of claim 10, wherein when generating the graphical representation of the implementation of the one or more telephony features the logic is further operable to:
    provide a modeling application operable to receive the plurality of instructions; and
    generate the graphical representation using the modeling application.

13. The logic embodied in the non-transitory computer readable medium of claim 12, wherein the modeling application is operable to generate the graphical representation in Unified Modeling Language or Freeform.

14. The logic embodied in the non-transitory computer readable medium of claim 10, wherein the graphical representation is selected from a group consisting of a flowchart, a state diagram, an activity diagram, a message sequence diagram, a message sequence and activity diagram, an interaction diagram, or any combination of the preceding.

15. The logic embodied in the non-transitory computer readable medium of claim 10, further operable to store the feature logic at a service framework at the endpoint, the service framework operable to provide the one or more telephony features from the feature logic.

16. The logic embodied in the non-transitory computer readable medium of claim 10, wherein the one or more telephony features are operable to receive an intercept at the occurrence of an event.

17. The logic embodied in the non-transitory computer readable medium of claim 10, wherein an action of a feature logic associated with the one or more telephony features specifies an output corresponding to a particular state of the one or more telephony features.

18. The logic embodied in the non-transitory computer readable medium of claim 10, wherein the feature logic is accessed using a web page.

19. A service creation environment for creating user-requested telephony features, comprising:
    a computing device; and
    an application stored on the computing device, the application operable to:

receive a plurality of instructions defining a graphical representation of an implementation of one or more telephony features for an endpoint, the graphical representation comprising a plurality of graphical elements, each graphical element representing at least a portion of a state process of the one or more telephony features;

generate the graphical representation in accordance with the plurality of instructions;

convert a first graphical element into a first text command;

convert a second graphical element into a second text command, the first and second text commands specifying a plurality of actions of the state process;

determine customized feature logic comprising the first and second text commands, the first and second text commands operable to provide the one or more telephony features for the endpoint; and communicate the customized feature logic to the endpoint for storage.

20. The service creation environment of claim 19, wherein when receiving the plurality of instructions the application is further operable to direct the creation of the one or more telephony features.

21. The service creation environment of claim 19, wherein the application comprises a modeling application, the graphical representation generated using the modeling application.

22. The service creation environment of claim 21, wherein the modeling application is operable to generate the graphical representation in Unified Modeling Language or Freeform.

23. The service creation environment of claim 19, wherein the graphical representation is selected from a group consisting of a flowchart, a state diagram, an activity diagram, a message sequence diagram, a message sequence and activity diagram, an interaction diagram, or any combination of the preceding.

24. The service creation environment of claim 19, wherein an action of the feature logic associated with the one or more telephony features specifies an output corresponding to a particular state of the one or more telephony features.

25. The service creation environment of claim 19, wherein the feature logic is accessed using a web page.

26. A system for the creation of user-requested telephony features, comprising:

a service creation environment comprising an application operable to:

receive a plurality of instructions defining a graphical representation of an implementation of one or more telephony features for an endpoint, the graphical representation comprising a plurality of graphical elements, each graphical element representing at least a portion of a state process of the one or more telephony features;

generate the graphical representation in accordance with the plurality of instructions;

convert a first graphical element into a first text command;

convert a second graphical element into a second text command, the first and second text commands specifying a plurality of actions of the state process;

determine customized feature logic comprising the first and second text commands, the first and second text commands operable to provide the one or more telephony features for the endpoint; and the endpoint in communication with the service creation environment, the endpoint comprising an integrated service framework operable to store the feature logic to create the one or more telephony features.

27. The system of claim 26, wherein when receiving the plurality of instructions the application is further operable to direct the creation of the one or more telephony features.

28. The system of claim 26, wherein the application comprises a modeling application, the graphical representation generated using the modeling application.

29. The system of claim 28, wherein the modeling application is operable to generate the graphical representation in Unified Modeling Language or Freeform.

30. The system of claim 26, wherein the graphical representation is selected from a group consisting of a flowchart, a state diagram, an activity diagram, a message sequence diagram, a message sequence and activity diagram, an interaction diagram, or any combination of the preceding.

31. The system of claim 26, wherein the one or more telephony features are operable to receive an intercept at the occurrence of an event.

32. The system of claim 26, wherein an action of the feature logic specifies an output corresponding to a particular state of the one or more telephony features.

33. The system of claim 26, wherein the feature logic is accessed using a web page.

* * * * *